Figure 3:
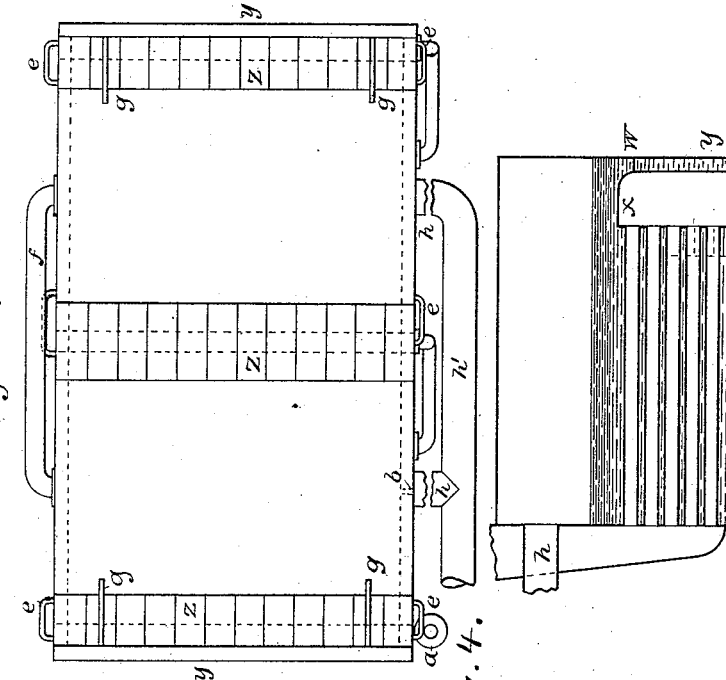

(No Model.)  6 Sheets—Sheet 1.

J. BAIRD.
STEAM BOILER.

No. 334,156.  Patented Jan. 12, 1886.

WITNESSES
Ed. A. Newman.
Al. C. Newman.

INVENTOR
John Baird
By his Attorneys
Baldwin Hopkins & Peyton (No Model.)  6 Sheets—Sheet 2.
J. BAIRD.
STEAM BOILER.
No. 334,156.  Patented Jan. 12, 1886.
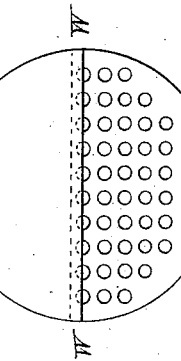
Fig. 7.
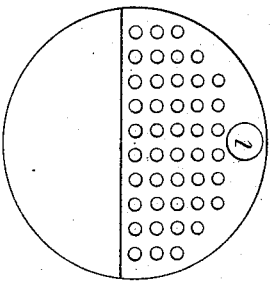
Fig. 31.
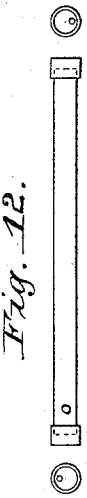
Fig. 12.
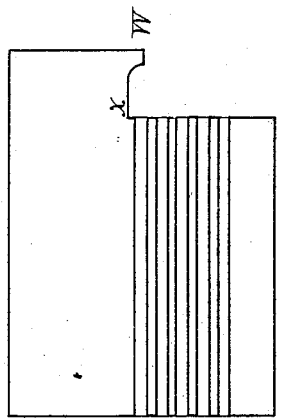
Fig. 5.
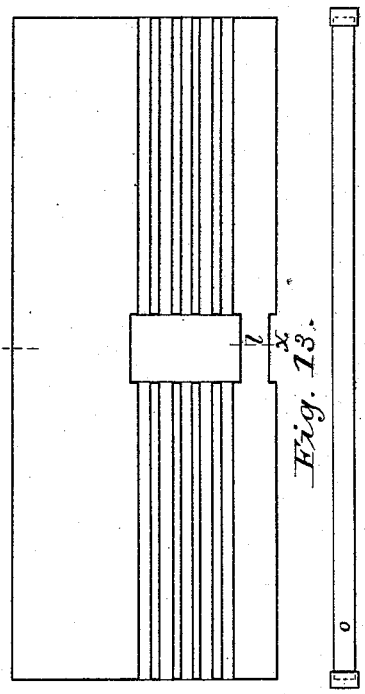
Fig. 29. Fig. 13.
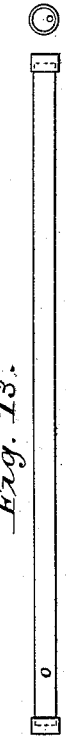
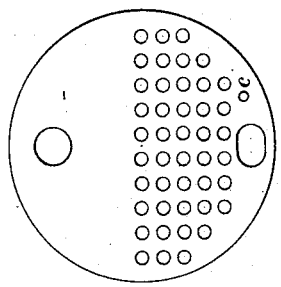
Fig. 6.
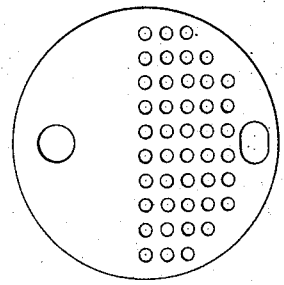
Fig. 30.
WITNESSES
Ed. A. Newman.
Al. C. Newman.
INVENTOR
John Baird.
By his Attorneys
Baldwin Hopkins & Peyton (No Model.)
6 Sheets—Sheet 3.

J. BAIRD.
STEAM BOILER.

No. 334,156.  Patented Jan. 12, 1886.

WITNESSES
Ed. A. Newman.
Al. C. Newman.

INVENTOR
John Baird.
By his Attorneys
Baldwin Hopkins & Peyton (No Model.) 6 Sheets—Sheet 4.
J. BAIRD.
STEAM BOILER.
No. 334,156. Patented Jan. 12, 1886.
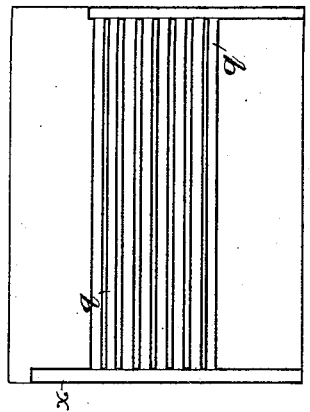
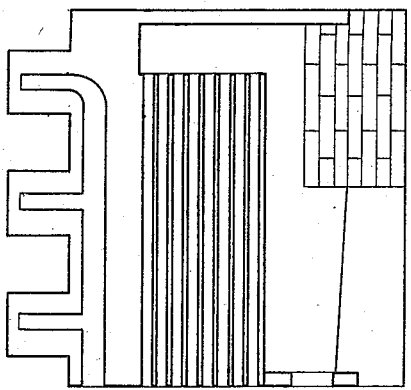
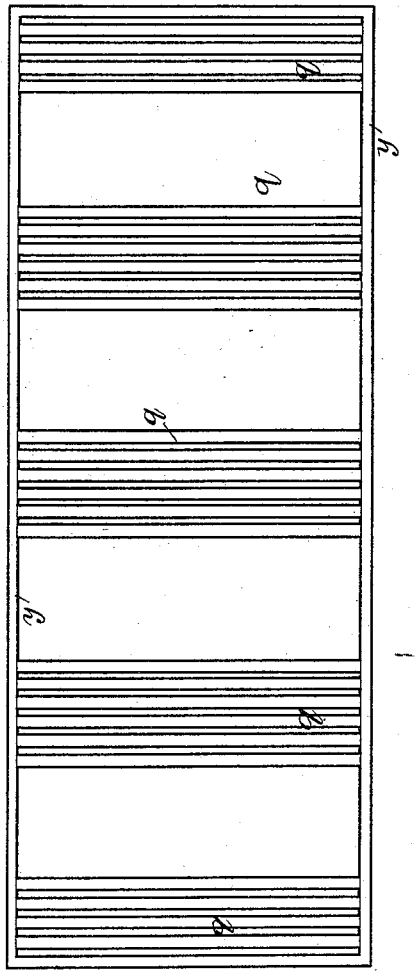
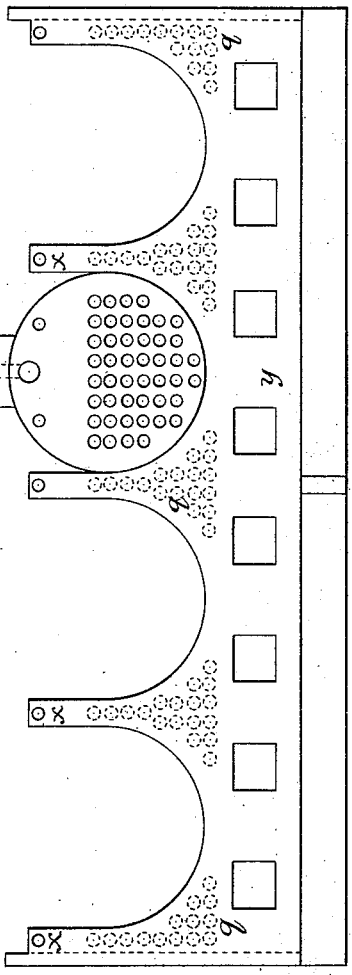
WITNESSES
Ed. A. Newman.
Al. C. Newman.
INVENTOR
John Baird
By his Attorneys
Baldwin Hopkins & Peyton (No Model.)  6 Sheets—Sheet 5.
J. BAIRD.
STEAM BOILER.
No. 334,156.  Patented Jan. 12, 1886.
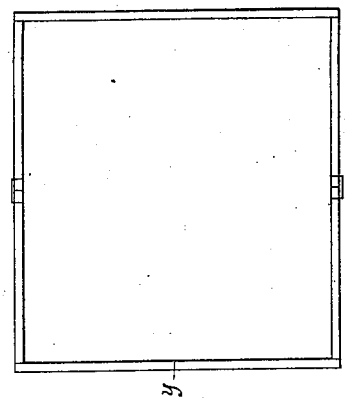
Fig. 22.
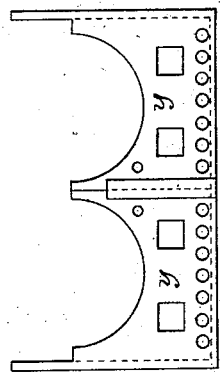
Fig. 21.
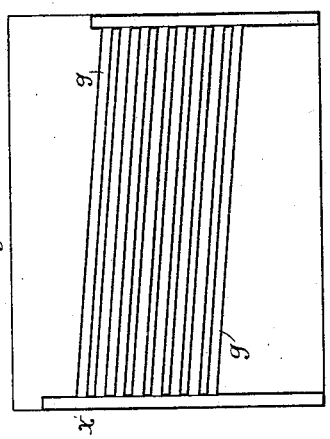
Fig. 17ª.
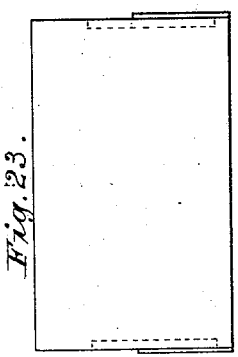
Fig. 23.
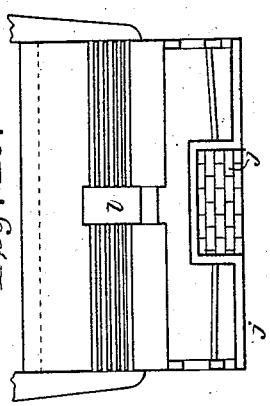
Fig. 19.
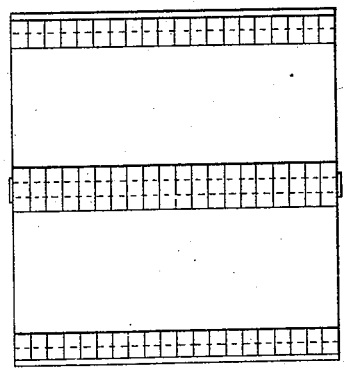
Fig. 20.
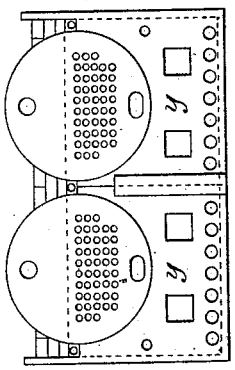
Fig. 18.
WITNESSES  
Ed. A. Newman.  
Al. C. Newman.
INVENTOR  
John Baird  
By his Attorneys  
Baldwin Hopkins & Peyton (No Model.) 6 Sheets—Sheet 6.
J. BAIRD.
STEAM BOILER.
No. 334,156. Patented Jan. 12, 1886.
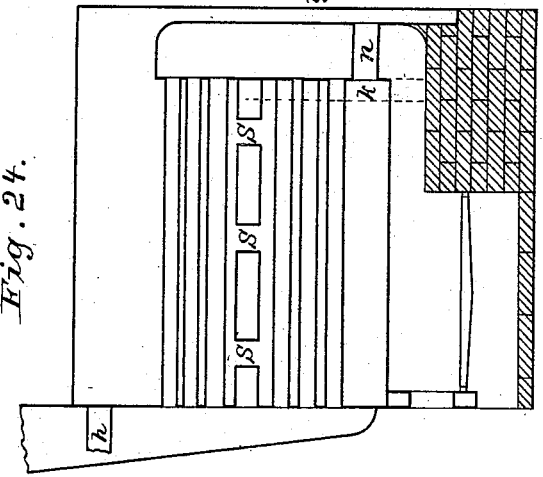
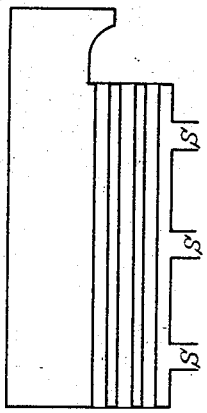
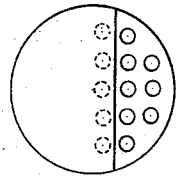
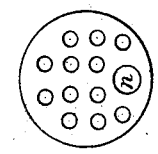
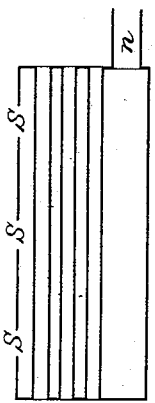
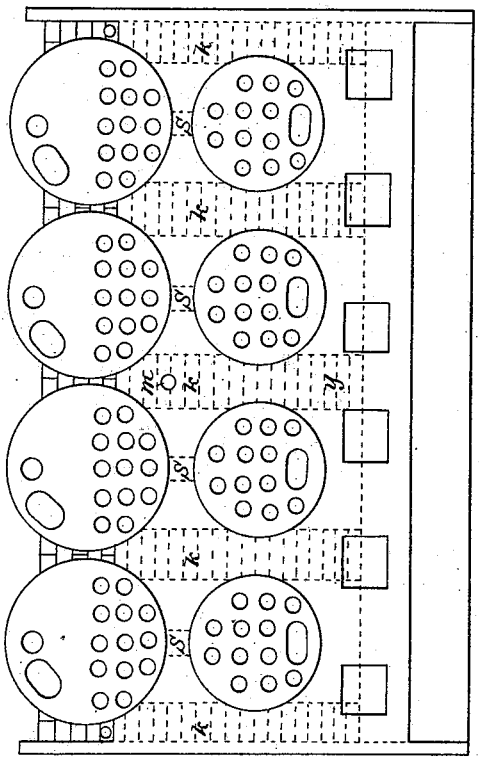
WITNESSES
Ed. A. Newman.
Al. C. Newman.
INVENTOR
John Baird
By his Attorneys
Baldwin Hopkins & Peyton

UNITED STATES PATENT OFFICE.

JOHN BAIRD, OF NEW YORK, N. Y.

STEAM-BOILER.

SPECIFICATION forming part of Letters Patent No. 334,156, dated January 12, 1886.

Application filed March 12, 1885. Serial No. 158,546. (No model.)

*To all whom it may concern:*

Be it known that I, JOHN BAIRD, mechanical engineer, of the city, county, and State of New York, have invented certain new and useful Improvements in Steam-Boilers; and I do hereby declare that the following, taken in connection with the drawings, is a full, clear, and exact description thereof.

The drawings are in six sheets, showing various modifications of my improvements, and the various figures will be defined and referred to hereinafter.

The object of my improvements is to provide a comparatively cheap, simple, and efficient boiler to be used in steam-vessels, where steam, as is now the practice, is used at a high pressure, as high as eighty to one hundred pounds to the square inch; but the boiler will be found useful where the pressure is comparatively low, and is applicable for stationary engines.

The great feature of the invention consists in combining one or more cylindrical-shell boilers with a cradle of boiler-iron or steel, the boilers being without water-legs, the cradles forming, in fact, the legs. These cradles are to be made of boiler-iron or steel, and have double walls throughout, the space between the walls being, when in use, filled with water, and the cradles serving as setting for boilers which have cylindrical shells. The walls of the cradle are to be braced to each other in a manner similar to the walls of locomotive or marine boilers by means of screw-bolts or socket-bolts, or other usual bracing, and the shells of the boilers will require no bracing, except that furnished by the tubes thereof and some suitable bracing at the heads in places where the tubes do not perform this duty.
The cradle is a vessel entirely distinct from the boiler, and is capable of containing water and steam when the boiler is removed. The cylindrical-shell boilers may be of any suitable construction. They may be fired at one end or at both ends; they may have return-tubes, or be of such a structure that the flame will pass only once through the boiler, as shown in the drawings, and they may be single-shelled boilers or have two shells, one above the other, as shown in Figures 23ª and 24. In addition to this great feature of the invention there are minor features—such as the brick-work, which may complete the inclosure of the shells, the brick-work for insuring full combustion, the supporting of the inclosing brick-work by water-tubes, and the combination, with the double-walled cradles, of tubes which connect the water-spaces and increase the heating-surface.

Figure 4:
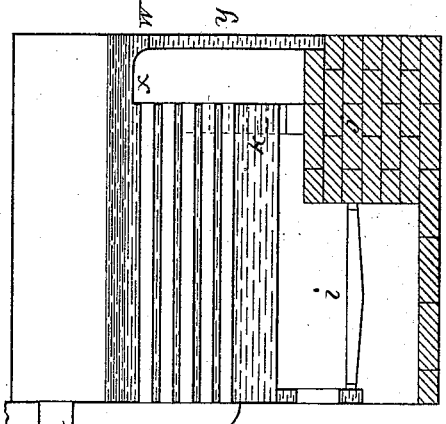
Figure 1:
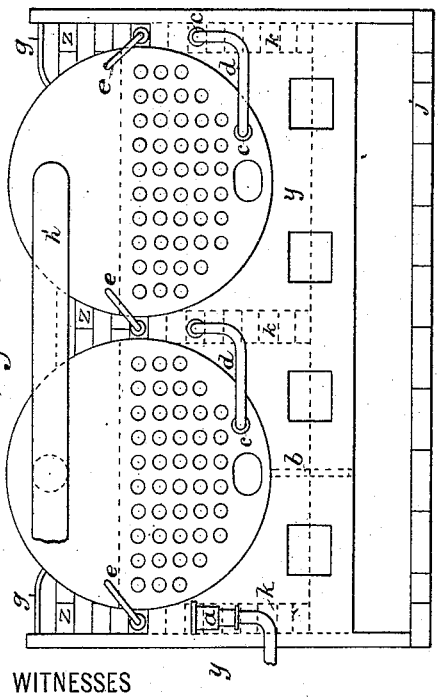
Figure 2:
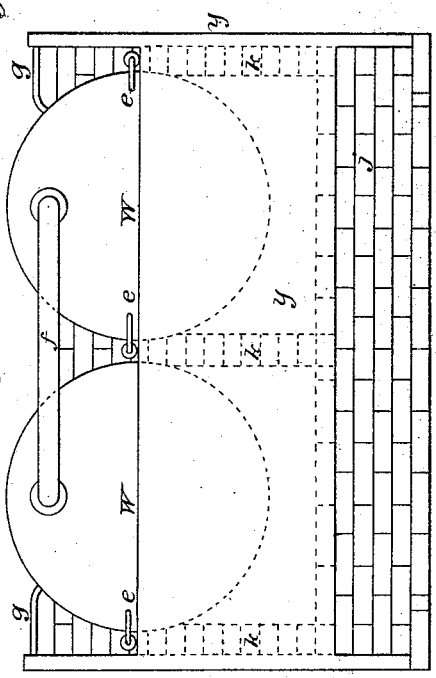
Figure 10:
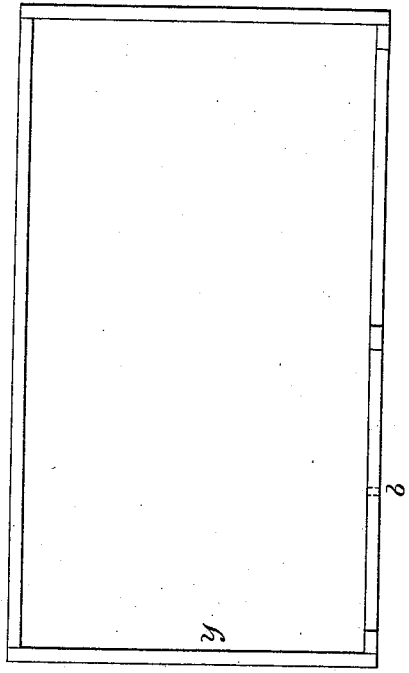
Figure 11:
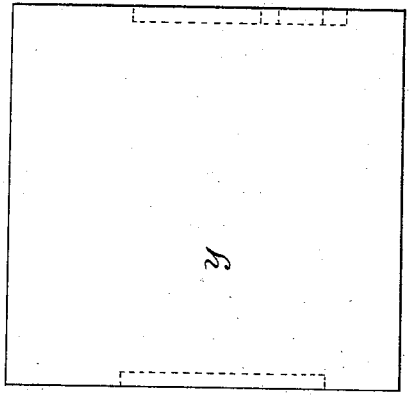
Figure 8:
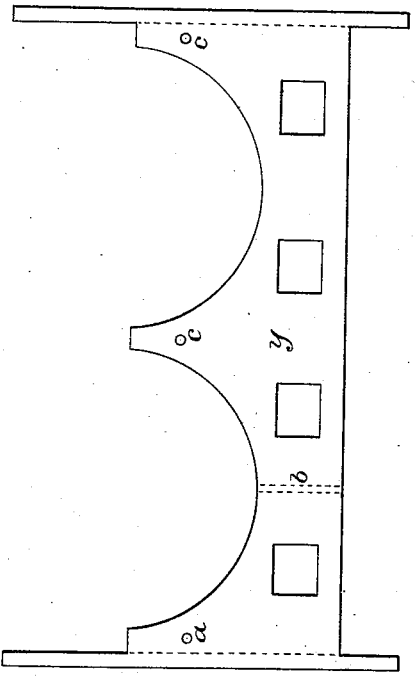
Figure 9:
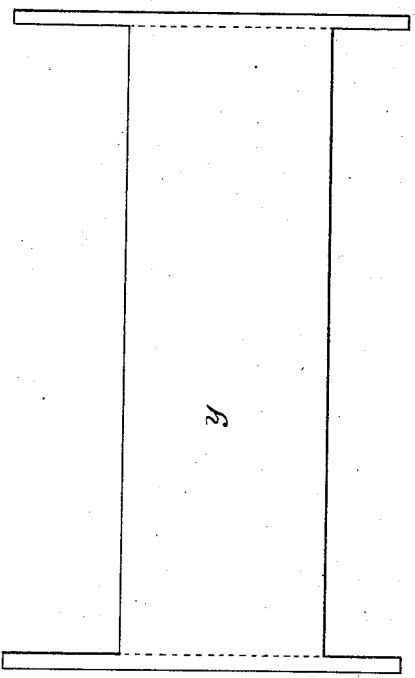

In describing my improvements I will first refer to Sheets 1, 2, and 3, from which a thorough knowledge of the main features of the invention can be derived. In these sheets, Fig. 1 is a front elevation of the boilers set in their cradle, showing also the brick-work and the supporting-pipes thereof. Fig. 2 is a rear elevation of the same. Fig. 3 is a top plan or view of the whole contrivance from above. Fig. 4 is a vertical longitudinal central section through one of the boilers and the cradle, &c. Fig. 5 is a central vertical longitudinal section through the boiler; Fig. 6, a front elevation thereof, and Fig. 7 a rear elevation of the same. Fig. 8 is a front elevation of the cradle; Fig. 9, a rear elevation of the same; Fig. 10, a plan of the same, and Fig. 11 a side elevation thereof.

In these drawings the boiler is shown with a cylindrical shell provided with tubes which return the products of combustion from rear to front, and also with a front connection or hood bolted to the outside of the shell, (see Fig. 4,) through which the smoke passes to the chimney. The shell is longer than the tubes, (see Figs. 5 and 7, Sheet 2, and Fig. 4, Sheet 1,) and the boiler is so made that the shell and a partial rear head and a curved piece, as at $x$, form the upper part of the rear connection. This boiler is set, as it were, in the cradle. This cradle is a double-walled box, $y$, without top or bottom. Its sides extend, as at $z$, above the water-level in the boilers, although their tops may lie below that level. Its front is provided with two semi-cylindrical depressions, in which the front edges of the shells rest, and at its rear the wall is flat, so as to support the lower flat surface of the rear head, $w$, Figs. 2, 4, and 5, and the shell of the boiler rests upon the cradle at front and rear. The sides of this box do not touch the shells of the boilers, although they might be made to do so, and the space above the ends and between the sides of the cradle and the shells is filled with brick-work. So also is the space above the cradle between the shells of the adjacent boilers.

The drawings show the cradles as in one piece; but each cradle may be in several pieces, providing the cavities or water-spaces therein have proper connections with each other, and the drawings before referred to show two boilers only in one cradle; but there may be three or more boilers in one cradle, provided the shape of the former be properly modified.

Brick-work $z\ z$ rests either on the shells where they adjoin, or partly upon the shells and partly against the inside walls of the sides of the cradle, and in order to hold and support it securely I provide a pipe or pipes $o$, which rest upon the front and rear of the top of the cradles, and these pipes have the lower tier of bricks built upon them. The ends of these pipes are capped, (see Figs. 12 and 13,) and the cavity of the pipes is connected with the boilers by pipes $e\ e$. I also connect the steam-spaces within the cradle-walls with the steam-space in the boilers by means of pipes $g\ g$, arranged as shown in the drawings, or in any proper manner, and these pipes may be more or less numerous. In order further to increase the heating-surface, I intend at times to connect the front and rear cavities or water-spaces of the cradles by means of tubes $q\ q$, these tubes occupying the space between the shells or between the outer shells and the sides of the cradle, as clearly shown in Figs. 13, 14, 15, and 16 of Sheet 6, where Fig. 13 is a longitudinal horizontal section through the lower tier of these tubes $q$ and the cradle; Fig. 14, a front elevation of the tubes $q$ and the cradles with one boiler in place. Fig. 15 is a vertical central section through the axis of the boiler and cradle; and Fig. 16, a section through the outside tier of tubes $q$, showing the side of the cradle in elevation. These tubes $q$, as before stated, connect the front and rear water-spaces of the cradle, and will therefore be filled with water. In order to make them circulate better, I intend at times to set them on an incline, as shown in Fig. $17^a$, so that the water will enter the lower and rise and pass out of the higher ends of the tubes, and so that any steam formed within them will freely pass in the same direction into a part of the cradle $x$ which is elevated above the water-level, and pass from thence by a suitable pipe into the steam-room in the boiler.

I prefer to deliver the feed-water for both cradles and shells into the cradles through a check-valve at $a$, Fig. 1, from a proper feed-pipe, and to provide the front water-space of the cradle with a partition, $b$, Figs. 1, 3, and 8. When this is done, the feed-water will circulate to the rear of the cradle, then return to its front and pass into the boiler through pipes $d\ d$, Figs. 1 and 3; but there may be several feed-pipes to each cradle, and the spaces in the cradles may have no partition, and these spaces may be connected with the boilers in any proper way; or there may be feed-pipes connecting with both the boilers and the cradles. I prefer to connect the steam-spaces in the boilers by means of pipes $f\ f$, Figs. 2 and 3, located at the rear thereof, and to connect the fronts of all the boilers, by means of pipes $h$, to a common steam-pipe, $h'$; but the steam-connections between the steam-spaces and those for conveying the steam to the engine may be applied according to the judgment of the engineer who puts up the battery of boilers.

In order to insure as far as possible the proper combustion of the gases and to give to the tubes of each boiler in the set their proper supply of flame, &c., I build brick walls or pillars $k\ k$ (see Figs. 1, 2, and 4, also $23^a$) on the top of the brick fire-bridge or brick bottom of the rear connection. These walls divide the flames passing from the several sets of grate-bars, so that the flames from the grate-bars under each boiler will pass to its corresponding back connection. The rear surfaces of these walls or pillars are about on a line with the rear tube-sheets of the boilers, and the walls extend up to the brick-work between the shells or between the outer peripheries of the outer shells and the sides of the cradle.

I prefer to construct the front walls of the cradles so that they do not extend downward much below the grate-bars, as shown in the drawings, so as to permit a full supply of air into the ash-pits below the grate-bars; but this wall may extend as low as the sides of the cradles and have holes formed in it for the admission of air. (See Fig. 21.) The front walls are to be furnished also with holes through which to charge the furnaces, and proper grate-bars, $i\ i$, must be supplied. I prefer to use brick-work $j\ j$ (see Figs. 1, 2, 4, 18, and 19) to form the bottoms of the ash-pits, the bridge-walls, and the bottom of the rear connections; but for these or any of them there may be substituted double walls of boiler-iron, properly braced to each other and forming water-spaces, these walls being either in one piece with or separate from the cradles, but in the latter case these water-spaces must be properly connected with the water-spaces in the cradles. (See Fig. 19.) The sides of the cradles may, in some instances, not extend above the water-line in the boilers, but I prefer to make them as shown in the drawings. The delivery ends of the boiler-tubes must in all cases be properly connected with the smoke-stack or chimney. I prefer to use hoods, as shown in Figs. 4, 19, and 24.

I sometimes intend to make the boilers double ended, with cradles having semi-cylindrical concavities at both front and rear. (See Sheet 5, where Fig. 18 is a front elevation of the boiler's cradle and brick-work with the hoods removed; Fig. 19, a central vertical longitudinal section through one of the shells; Fig. 20, a top view; Fig. 21, an elevation of the front of the cradle; Fig. 22, a plan of the same, and Fig. 23 a side elevation.)

These boilers are to be fired at both ends and to be fed with water, as before described, and I prefer to pass through the back connection a tube, $l$, uniting the water-space of the front and rear sections of the boiler, thus insuring circulation. When intending to use steam at over one hundred pounds to the inch, or even lower, I intend at times to make each boiler in two tiers—that is, with two cylindrical shells, one above the other, either the upper only or both shells being supplied with tubes. Fig. 23$^a$ is a front elevation of this arrangement, showing the cradle, brick-work, &c. Fig. 24 is a vertical lengthwise section through one of the boilers, cradle, and brick bottom thereof; Fig. 25, a similar section through a lower-tier shell; Fig. 26, a rear elevation of the same; Fig. 27, a vertical central lengthwise section through an upper-tier shell, and Fig. 28, a rear elevation of the same.

In this arrangement I prefer to use pipes $n$, connecting the lower-tier shells with the rear water-space of the cradles and to connect each lower shell to each upper corresponding one by the ordinary vertical water-tubes, $s\ s\ s$. The front of the cradle for these double tier boilers must have cylindrical apertures in it to receive the front ends of the lower shells, and these holes must be somewhat larger in diameter than the shells, so that the boilers may be set in the cradles, any cracks or crannies between the shells and the cradles being, if necessary, stopped with clay or fire-lute.

Fig. 29 is a lengthwise vertical central section through a double-ended boiler; Fig. 30, a front elevation of the same, and Fig. 31 a vertical section on the line $x\ x$ of Fig. 8, showing the tube-sheets in elevation.

It will be clear from what has been said heretofore that the boiler to be combined with the cradle may be of any internal structure—that is, as to arrangement of flues or tubes and connections—provided it has a cylindrical shell or shells, the great object of my invention being to utilize the strength due to a complete cylindrical shell in connection with the heating-surface of double-wall fire-boxes, and incidentally to provide for the separate renewal or repair of the fire-boxes which constitute the cradle.

I claim as of my own invention—

1. The combination of a cylindrical boiler provided with proper flues or tubes, and of the same length as the cradle, with a cradle composed of double walls, so as to contain water, and inclosing the fire on all four sides, said cradle serving as a boiler-setting and being so shaped that the two ends of the boiler rest the one upon the front the other upon the rear of the cradle, and the whole combination being substantially such as set forth.

2. The combination of a cylindrical boiler provided with proper flues or tubes with a cradle, said cradle serving the purpose of a boiler-setting and being composed of double walls, so as to contain water, and inclosing the fire on all four sides, the front and rear walls of the cradle being connected by water-circulating tubes, said cradle also supporting the boiler and combined therewith, substantially as described.

3. The combination, with a cylindrical-shell boiler or boilers and a cradle, substantially as specified, of the brick-work supported by a tube or tubes and lying between adjacent boilers or a boiler and a cradle.

4. The combination, with a boiler or boilers and a cradle, substantially as specified, of the brick walls or pillars in the neighborhood of the back connections, which serve to insure combustion and divide the products of combustion, substantially as set forth.

5. The devices for insuring circulation, consisting of a feed-aperture into the cradle, a partition in the cradle, and pipes connecting the cradle with the boiler or boilers, the whole being and operating substantially as described.

JOHN BAIRD.

In presence of—
 WILLIAM R. WILDER,
 JOHN S. BAIRD.